United States Patent [19]

Inoue et al.

[11] 4,018,706
[45] Apr. 19, 1977

[54] CATALYSTS FOR PURIFYING EXHAUST AND WASTE GASES

[75] Inventors: Akira Inoue, Minoo; Koshi Horie, Suita; Koichi Saito, Ohyamazaki; Yukio Aoki, Suita; Tetsuji Ono, Amagasaki; Takashi Ohara, Nishinomiya, all of Japan

[73] Assignee: Nippon Shokubai Kagaku Kogyo Co., Ltd., Osaka, Japan

[22] Filed: July 20, 1976

[21] Appl. No.: 707,086

[30] Foreign Application Priority Data

July 21, 1975 Japan ............................. 50-88433
Mar. 1, 1976 Japan ............................. 51-21186

[52] U.S. Cl. ............................. 252/430; 252/435; 252/437; 423/213.2; 423/305
[51] Int. Cl.$^2$ ..................... B01J 31/26; B01J 27/14; B01J 8/02; C01B 25/26
[58] Field of Search ................... 252/435, 437, 430; 423/213.2, 305

[56] References Cited

UNITED STATES PATENTS

| | | | |
|---|---|---|---|
| 2,650,201 | 8/1953 | Mavity | 252/435 |
| 2,727,010 | 12/1955 | Zimmerschied | 252/437 X |
| 2,824,073 | 2/1958 | Rylander et al. | 252/437 X |
| 3,538,122 | 11/1970 | Friedrichsen et al. | 252/435 X |
| 3,789,018 | 1/1974 | Levy et al. | 252/430 X |

*Primary Examiner*—Winston A. Douglas
*Assistant Examiner*—William G. Wright
*Attorney, Agent, or Firm*—Sherman & Shalloway

[57] ABSTRACT

A catalyst for purifying exhaust and waste gases comprising

A. a support substrate comprising 2 to 100% by weight of an oxide complex of titanium and phosphorus containing titanium and phosphrus in such a proportion that the molar ratio of $TiO_2$ to $P_2O_5$ is from 5.0 to 0.5 and 98 to 0% by weight of aluminum oxide, and B. supported on said substrate as a catalytic substance, 2 to 300 parts by weight, calculated as metal oxide per 100 parts by weight of the support substrate (A), of at least one heavy metal selected from the group consisting of Ni, Cu, Cr, Fe, Co, Mn, Bi, V, W, Mo, Sn, Zn, Zr, Pb, Sb, Ti, Ta, Cd and Nb, or 0.01 to 1.0 part by weight, calculated as metal per 100 parts by weight of the support substrate (A), of at least one noble metal selected from the group consisting of Pt, Pd, Rh, Ir, Os and Ru.

7 Claims, No Drawings

CATALYSTS FOR PURIFYING EXHAUST AND WASTE GASES

This invention relates to catalysts for purifying exhaust and waste gases, and more specifically to catalysts capable of converting nitrogen oxides (mainly nitrogen monoxide; to be referred to as $NO_x$), carbon monoxide (CO) and hydrocarbons (lower hydrocarbons and their partially oxidized products; to be referred to as HC) contained in exhaust and waste gases containing oxygen and sulfur oxides (mainly sulful dioxide; to be referred to as $SO_x$) to nontoxic nitrogen ($N_2$), carbon dioxide ($CO_2$) and water ($H_2O$) respectively with high efficiency, and inhibiting the oxidation of sulfur dioxide ($SO_2$) in the exhaust gases to sulfur trioxide ($SO_3$).

Exhaust gases containing $O_2$, $SO_2$ and NO as main ingredients from boilers using heavy oils or coal and exhaust gases containing $O_2$, $SO_2$, NO, CO and HC from combustion engines, especially automobile engines, using such fuels as gasoline are well known exhaust gaste gases containing oxygen and $SO_x$. In the former, it is $NO_x$ containing NO as a main ingredient that is to be removed, and in the latter, not only $NO_x$ but also CO or HC is to be removed. Accordingly, investigations on catalysts suitable for each of these exhaust gases have been made over many years.

It is an object of this invention to provide catalysts which can be used effectively for a process of purifying these exhaust and waste gases.

In order to remove $NO_x$ from boiler exhaust gases, adsorption methods, absorption methods, and catalytic reducing methods have heretofore been developed. The catalytic reducing methods are suitable for dealing with large quantities of exhaust gases, and of these, a process comprising adding ammonia as a reducing agent to catalytically reduce $NO_x$ selectively to $N_2$ was reported to be superior. The success of this process, however, depends upon whether a catalyst suitable for the composition and properties of an exhaust gas to be treated is available. The requirements of catalysts usable in this method are fourfold. Firstly, they must reduce only $NO_x$ selectively with good efficiency and durability without being affected by oxygen, sulfur compounds, carbon dioxide, carbon monoxide, steam, etc. present in the exhaust gases. Secondly, they must reduce $NO_x$ over a broad temperature range and at as low a temperature as possible below 400° C. since the temperature at the exit of an economizer attached to a boiler system is generally about 400° C. Thirdly, they must sufficiently function at an economically high space velocity. Lastly, they should not lose activity even when soot comprising carbon, iron and various heavy metals contained in the exhaust gases is deposited thereon.

Catalysts comprising noble metals such as platinum or palladium supported on a carrier such as active alumina have been well known as catalysts used in the selective catalytic reducing method using ammonia as a reducing agent. It is known however that the $NO_x$ reducing activity of the catalysts decreases with time because of adverse effects exerted by sulfur compounds, oxygen, carbon dioxide, and steam, particularly the sulfur compounds present in amounts of more than 100 ppm, in the exhaust gases. Our experiments have shown that catalysts obtained by supporting copper oxide on an active alumina carrier known as heavy metal catalyst are poisoned by sulfur compounds present in exhaust gases, particularly by sulfur oxides present in high concentrations. Catalysts of this type, as disclosed, for example, in British Patent Specification No. 1,089,716, are also known as adsorbents for removing sulfur oxides from exhaust gases. Our investigations led to the discovery that in this prior art method, sulfur deposits with time on the catalyst to change copper oxide to copper sulfate, and a part of the active alumina is converted to alumina sulfate, with the result that the catalytic activity is reduced with the passage of time.

Thus, we have found that when treating an exhaust gas containing sulfur compounds in high concentrations, active alumina cannot be directly used as a carrier, but should be in the form which does not permit the deposition of sulfur, or should be such that the deposition of sulfur does not cause changes in the composition of the catalyst.

We have made extensive investigations in order to obtain an improved catalyst for use in the selective catalytic reduction using ammonia as a reducing agent, which catalyst has durability and is capable of reducing $NO_x$ to non-toxic nitrogen with good efficiency at relatively low temperatures and high space velocities without being affected by sulfur compounds, oxygen, carbon dioxide gas, steam, soot, etc. present in a boiler exhaust gas, especially by the sulfur compounds. As a result, we have found that a catalyst prepared by using an oxide complex of titanium and phosphorus comprising $TiO_2$ and $P_2O_5$ in a molar ratio of from 5.0 to 0.5, preferably from 2.6 to 1.0, and having a pore volume of 0.4 to 8 cc/g as a support substrate (A), and supporting 2 to 300 parts by weight, calculated as a metal oxide based on 100 parts by weight of the support substrate (A), of a catalytic substance (B) consisting of at least one heavy metal selected from the group consisting of Ni, Cu, Cr, Fe, Co, Mn, Bi, V, W, Mo, Sn, Zn, Zr, Pb, Sb, Ti, Ta, Cd and Nb is free from the aforesaid defects, and exhibits superior performance over long periods of time.

We have also discovered that when a material obtained by depositing the oxide complex of titanium and phosphorus uniformly on the surface of activated alumina is used as the support substrate, a catalyst can be obtained which exhibits a stable activity of $NO_x$ reduction over long periods of time without being affected by sulfur at all. This will be described later on by reference to Comparative Examples.

The catalyst of this invention is characterized in that it has an extremely low activity to oxidize $SO_2$ present in exhaust gases to $SO_3$. For this reason, the use of the catalyst of this invention makes it possible to prevent the rise of the dew point temperature caused by $SO_3$ formed in exhaust gases and thus to carry out heat exchange in heat exchangers economically, and also to prevent corrosion by $SO_3$ thereby permitting a very advantageous commercial operation. In order to inhibit the oxidation of $SO_2$ to $SO_3$ greatly and to maintain the build-up of $SO_3$ in exhaust gases at a low level, the support substrate preferably has a high content of the oxide complex of titanium and phosphorus.

The "oxide of titanium and phosphorus", as used in the present application, denotes a complex compound resulting essentially from the bonding of titanium and phosphorus to oxygen, and is recognized as titanium phosphate. A mixture consisting of the titanium phosphate and an oxide of titanium and/or an oxide of phosphorus can also be used as the support substrate in the present invention.

A certain kind of combustion exhaust gas, for example, an exhaust gas from a sintering furnace for iron ore used in the steel industry containas 0.5 to 2% of CO in addition to $NO_x$, $SO_2$, $H_2O$, $CO_2$ and $O_2$. If CO is catalytically oxidized with about 15% of $O_2$ in the presence of an oxidation catalyst and the temperature of the exhaust gas is elevated by utilizing the heat of combustion generated at this time, the subsequent reaction with an $NO_x$ reducing catalyst would be carried out smoothly. However, when the conventional oxidation catalysts are used in this oxidation process, the oxidation of $SO_2$ to $SO_3$ occurs simultaneously with the oxidation of CO to $CO_2$. This would lead to the serious defect that the piping in the reactor is corroded, and the $NO_x$ reducing catalyst which acts after the oxidation catalyst is rapidly reduced in activity. The use of the catalyst of this invention in this process, however, enables the oxidation of $SO_2$ to $SO_3$ to be extremely inhibited, and the intended utilization of the heat of reaction can be achieved without any adverse effect on the activity of the catalyst to oxidize CO to $CO_2$. Since the catalyst of this invention can thus be used in treating gases containing combustible substances, it has a high commercial advantage.

Such a technique in accordance with this invention can be effectively applied also to catalysts for purifying exhaust gases from internal combustion engines, particularly motor vehicle engines.

As a measure for controlling exhaust gases from internal combustion engines, particularly motor vehicle engines, catalyst converters packed with oxidation catalysts came into use in U.S.A. in 1975 new model cars, and in Japan partly in new models manufactured from April 1957 onward. These converters have been able to convert toxic exhaust substances such as HC and CO to non-toxic $CO_2$ and $H_2O$ without scarcely reducing the performance of engines and while maintaining the fuel cost at economic levels, and have greatly contributed to the control of exhaust gases.

With the widespread employment of catalytic converters, sulfur trioxide ($SO_3$) and sulfuric acid mist in automobile exhaust gases have begun to arouse anxiety as a source of pollution.

Gasoline contains about 0.01 to 0.05% by weight of sulfur which is oxidized in the engines to about 10 to 30 ppm of sulfur dioxide ($SO_2$) and other oxygen-containing sulfur compounds. These oxidation products have been directly released in the past. However, when catalytic converters are used, a part of $SO_2$ formed within the engine is oxidized to $SO_3$ by the oxidation catalyst in the catalytic converters. It is released either directly or as sulfuric acid mist as a result of reaction with moisture in the exhaust gas to create a new source of pollution.

Since the rate of conversion of $SO_2$ to $SO_3$ is greatly affected by the concentration of oxygen present, this new problem would be advantageously solved by minimizing the oxygen concentration in the gas at the inlet of the catalytic converter. Prior suggestions in an attempt to solve this problem include, for example, a method in which the air-to-fuel ratio is controlled within a very narrow range to bring it to near the stoidiometric ratio using an oxygen sensor and an air-to-fuel ratio control device thereby to restrict the oxygen concentration in the exhaust gas within a certain low concentration range, and under these conditions, a three way catalyst capable of removing HC, CO and $NO_x$ simultaneously is employed, and a method wherein a part packed with an $SO_3$ adsorbent consisting mainly of calcium oxide is provided in an exit pipe of an oxidation catalyst converter so as to adsorb and remove $SO_3$ generated by the oxidation catalyst. However, these prior methods still pose a problem. The three way catalyst method suffers from the unsatisfactory reliability of the control system even when the problem of the catalyst is set aside, and the $SO_3$ adsorbent method has the disadvantage that the adsorbent has a limited adsorbing capacity, pressure loss increases as a result of providing the adsorbent-packed layer, and consequently, the engine power is reduced.

As a means to solve these problems, the present invention provides a catalyst comprising a support substrate (A) composed of the aforesaid oxide complex of titanium and phosphorus, or composed of the oxide complex of titanium and phosphorus and aluminum oxide deposited thereon, and 0.01 to 1.0 part by weight, calculated as a metal per 100 parts by weight of the support substrate (A), of a catalytic substance (B) consisting of at least one noble metal selected from the group consisting of Pt, Pd, Rh, Ir, Os and Ru supported on said support substrate (A).

The use of this catalyst brings about an outstanding inhibition of the oxidation of $SO_2$ to $SO_3$ as compared with the use of a catalyst prepared by supporting the same catalytic substance on a known activated alumina carrier, and the catalyst exhibits superior performance in the treatment of CO, HC and $NO_x$. Especially when palladium or both palladium and platinum are used as the catalytic substance, the rate of conversion of $SO_2$ to $SO_3$ is drastically reduced, and yet the activity of the catalyst to oxidize CO and HC is scarcely impeded.

Preferred embodiments of the present invention are described below.

Catalysts for purifying boiler exhaust gases can be prepared in the following manner.

Titanium phosphate as a support substrate can be produced by mixing a water-soluble titanium compound such as titanium tetrachloride or titanium sulfate as a titanium source and a water-soluble phosphorus compound such as phosphoric acid or ammonium phosphate as a phosphorus source both in the form of aqueous solutions while stirring with the $TiO_2/P_2O_5$ molar ratio being adjusted to a specified range, aging the mixture at room temperature to 100° C. to get a titanium phosphate precipitate, separating this precipitate by filtration, followed by drying, and then calcining at 400° to 1,000° C.

The titanium phosphate support substrate so prepared is low in cost because of the ease of preparation. A support substrate composed of titanium phosphate which is porous and has a high surface area can be used at high space velocities within a broad temperature range, and can be prepared, for example, by adding an aqueous solution of a titanium compound containing 0.05 to 0.5 mol/liter of a titanium ion to an aqueous solution containing 0.05 to 0.5 mole/liter of a sulfuric acid ion, further adding an aqueous solution of a phosphorus compound containing 0.035 to 0.65 mole/liter of a phosphorus ion, reacting the mixture at 60° to 90° C., aging the mixture at this temperature for at least 2 hours to form titanium phosphate, separating it by filtration, drying it, and then calcining it at 100° to 650° C. for 1 to 10 hours. The resulting titanium phosphate has a surface area of 10 to 400 m²/g and a pore volume of 0.4 to 8 cc/g. In the present invention, the support substrate preferably has a surface area of at least 30 m²/g, particularly 50 to 100 m²/g, and a pore volume of 2.5 to 5 cc/g.

The $TiO_2/P_2O_5$ molar ratio in the titanium phosphate can be adjusted as desired, but is preferably from 5 to 0.5 especially preferably from 2.6 to 1.

The titanium phosphate is not limited to those obtained by the methods described hereinabove, but titanium phosphates obtained by methods other than those described above can be fully used in this invention if they have a $TiO_2/P_2O_5$ molar ratio of from 5 to 0.5 and a surface area of 10 to 400 m²/g.

The support substrate composed of the titanium phosphate and aluminum oxide is prepared by impregnating a molded or pelletized activated alumina carrier with the titanium compound and phosphorus compound, and calcining the impregnated carrier at 800° to 1200° C.; or by mixing the titanium compound and phosphorus compound or a titanium phosphate powder with the activated alumina or a powder of alumina hydrate, a precursor of it, molding the mixture, and calcining the molded mixture at 800° to 1200° C. Desirably, the aluminum oxide is contained in an amount of up to 98% by weight, preferably 50 to 98% by weight, based on the total weight of the support substrate.

Preferably, the support substrate used in this invention is a granular extrudate having a particle diameter of 2 to 10 mm in various shapes such as spherical, conical, cylindrical or irregular shapes including those having an 8-shaped, clover leaf-shaped or dumbbell-shaped cross-section.

The oxides of heavy metals used as the catalytic substance in the catalyst of this invention are the oxides of nickel, copper, chromium, iron, cobalt, manganese, bismuth, vanadium, tungsten, molybdenum, tin, zinc, zirconium, lead, antimony, titanium, tantalum, cadmium and niobium. The oxides of vanadium, copper, chromium, iron and tungsten are especially preferred. Starting raw materials for the heavy metal oxides are, for example, the oxides, hydroxides, inorganic acid salts, organic acid salts, particularly ammonium salts, oxalic acid salts, nitric acid salts, and sulfuric acid salts, and also halogenides of these metals. The heavy metal oxide is supported in an amount of 2 to 300 parts by weight, per 100 parts by weight of the support substrate.

Most simply, the catalyst of this invention comprising titanium phosphate as a support substrate and vanadium oxide as a catalytic substance, for example, can be prepared by a method which comprises adding a powder of titanium phosphate to an aqueous solution of a vanadium compound or an acidic aqueous solution of the vanadium compound further containing oxalic acid or hydrochloric acid, kneading the mixture thoroughly by a kneader, shaping the mixture by an extruder, drying the extrudate at 120° to 150° C., and calcining it in air for several hours at a temperature of 300° to 650° C., preferably 400° to 500° C.; or by a method which comprises making titanium phosphate into spherical or cylindrical pellets, and supporting the vanadium component by impregnation or spraying. The method of preparation is not limited to these, but for example, titanium phosphate and vanadium oxide can be directly kneaded.

Furthermore, a catalyst comprising titanium phosphate as a support substrate and vanadium oxide and titanium oxide as a catalytic substance can be prepared, for example, by using an aqueous solution containing both a vanadium compound and a titanium compound instead of the solution containing the vanadium compound in the above-described process for preparation. Or it can be prepared by adding a powder of titanium phosphate and a powder of titanium oxide to a solution containing a vanadium compound, kneading the mixture, and molding the resulting mixture.

The exhaust gas to be treated with the catalyst of this invention usually contains 10 to 1,500 ppm of sulfur oxides, 1 to 20% of oxygen, 1 to 15% of carbon dioxide, 5 to 15% of steam and 100 to 1,000 ppm of $NO_x$ (mainly NO). Ordinary boiler exhaust gases have compositions within this range. Needless to say, exhaust gases containing $NO_x$ but free from sulfur oxides can also be treated with the catalyst of this invention.

The treating conditions differ according to the type and properties of the exhaust gases. For example, the amount of ammonia ($NH_3$) is preferably 0.5 to 3 moles per mole of $NO_x$. Most of $NO_x$ contained in boiler exhaust gases is NO, and since the equivalent ratio of NO and $NH_3$ for the reduction of NO with $NH_3$ is 3:2, it is appropriate to add ammonia in an amount somewhat exceeding the equivalent, that is, in an amount of about 1 mole per mole of $NO_x$. The reaction temperature is usually 200° to 400° C., particularly 280° to 350° C. The space velocity is 1,000 to 50,000 $hr^{-1}$, particularly 3,000 to 30,000 $hr^{-1}$.

Methods of preparation and use of catalysts for purifying exhaust gases from internal combustion engines are described below.

Usually, catalysts for use in oxidizing HC and CO in exhaust gases from stationary sources, that is, exhaust gases from industrial processes, are not required to have as high mechanical strength as is required for purifying motor vehicles exhausts. Oxidation of exhaust gases from a sintering furnace for iron ore as described hereinabove can be achieved by using a catalyst obtained by supporting a catalytic substance having the ability to completely oxidize CO (noble metals when activities at low temperatures are intended, and heavy metal oxides where oxidizing activities at relatively high temperatures are described) on the same support substrate as that used as an $NO_x$ reducing catalyst. Thus, a catalyst comprising a porous high-surface area support substrate and a noble metal supported thereon, which can be used exclusively for treating motor vehicle exhausts, specifically, a catalyst comprising a support substrate composed of titanium phosphate and alumina oxide and supported thereon, 0.01 to 1.0 part by weight, preferably 0.03 to 0.8 part by weight, per 100 parts by weight of the support substrate, of platinum, palladium, rhodium, iridium, osmium or ruthenium is described below.

The starting material for aluminum oxide as the support substrate is any material capable of forming activated alumina upon calcination, for example, alumina hydrates such as alumina hydrogel, alumina xerogel, or gibbsite, or a powder of rho-alumina ($Al_2O_3·0.5\ H_2O$). The support substrate having the above-specified properties is prepared in accordance with the method of producing the support substrate described hereinabove. Then, a raw material for the catalytic substance, such as a source of palladium, or both a palladium source and a platinum source, is deposited on the support substrate so prepared. The palladium source that can be used may be an aqueous solution, an acidic aqueous solution or an organic solvent solution of palladium nitrate, palladium chloride, palladium acetate, or palladium oxalate. The platinum sources include, for example, an aqueous solution, an acidic or alkaline aqueous solution or an organic solvent solution of chloroplatinic acid, platinum nitrate, or platinum dinitrodiammine. The sources of catalytic substance are supported or deposited on the support substrate by impregnating the substrate with such a solution and then drying it; or by immersing the substrate in such a solution and evaporating the solution to dryness.

In supporting the various sources of catalytic substance, the use of noionic surfactant of the polyoxyethylene type is very effective. The use of the surfactant causes moderate foaming to facilitate the contact of the aqeuous solution of catalytic substance, the carrier particles, and the walls of the catalyst-preparing vessel with one another. Hence, the supporting is uniform, and the results of the supporting are reproducible. Moreover, the catalytic substance is effectively deposited to the surface of the support substrate because of the low penetrating property of the surfactant. As a result, a catalyst having a high level of performance can be obtained by a minimum amount of the catalytic substance supported. These advantages of using surfactants are fully exhibited in manufacturing great quantities of catalyst.

Examples of the surface active agent used in the process of this invention include polyethylene glycol [$HO(CH_2CH_2O)_nH$ ($n=11 - 900$)], polyoxyethylene glycol alkyl ethers [$RO(CH_2CH_2O)_nH$ (R = an alkyl group with 6 to 30 carbon atoms; $n=3 - 120$)], polyoxyethylene-polyoxypropylene-polyoxyethylene glycol [$HO(CH_2CH_2O)_a(CH_2CH_2CH_2O)_b(CH_2CH_2O)_cH$ ($a$, $b$ and $c$ are at least 1, and $a + b + c = 20 - 400$)], "Tetronic-type" nitrogen-containing nonionic surfactants expressed by the general formula

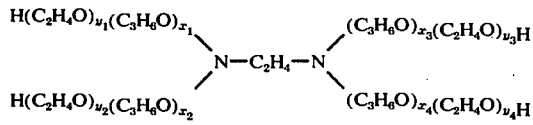

wherein $X_1$ to $x_4$ and $y_1$ to $y_4$ are each at least 1, and $x_1 + x_2 + x_3 + x_4 + y_1 + y_2 + y_3 + y_4 = 20 - 800$, polyoxyethylene alkyl aryl ethers

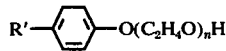

(R' = an alkyl group with 6 to 12 carbon atoms; $n = 3 - 120$)], polyoxyethylene alkyl esters [$R-COO(C_2H_4O)_nH$ or $R-COO(C_2H_4O)_{n-1}-CH_2CH_2COO-R$ (R = an alkyl group with 6 to 24 carbon atoms; $n=3 - 120$)], polyoxyethylene alkylamines [$R-NH(C_2H_4O)_nH$ or

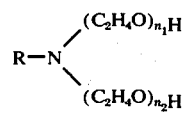

wherein R is an alkyl group with 6 to 30 carbon atoms, and $n$, $n_1$ and $n_2$ are each 3 to 120, polyoxyethylene alkylamides [$R-CONH(C_2H_4O)_nH$ or

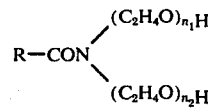

wherein R is an alkyl group with 6 to 30 carbon atoms, and $n$, $n_1$ and $n_2$ are each 3 to 120, and fatty acids esters of polyoxyethylene sorbitan expressed by the following formula

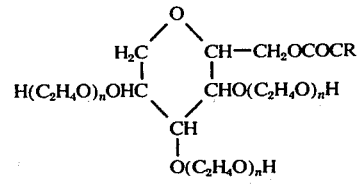

wherein R is an alkyl group with 6 to 24 carbon atoms, and $n$ is 3 to 60.

Of these polyoxyethylene-type nonionic surfactants, those having an average molecular weight of at least 500 are preferred. If the average molecular weight is lower than 500, the penetration power of the surfactant increases, and the catalytic component (particularly, the noble metal component) is penetrated deep into the interior of the carrier. Hence, it is necessary to increase the amount of the catalyst component to be supported. The amount of the surfactant used is 0.1 to 50 g, preferably 0.2 to 20 g, per liter of the carrier. When it is to be added to an aqueous solution of the catalyst component, its amount is 0.01 to 10% by weight, preferably 0.02 to 5% by weight.

The desired catalyst can be obtained by drying the support substrate having deposited thereon a source of catalytic substance, especially a palladium source of both a palladium source and a platinum source, in the manner described hereinabove, at 30° to 200° C., preferably 70° to to 170° C., and then calcining it in air at a temperature of 300° to 700° C., preferably 400° to 600° C.; or subjecting it to a reducing treatment in a hydrogen/nitrogen gas at a temperature of 150° to 600° C., preferably 250° to 500° C. The catalyst can also be activated by treatment in an exhaust gas from an internal combustion engine instead of the treatment in air, hydrogen gas, or hydrogen/nitrogen gases as described above.

In the present invention, the rate of conversion of $SO_2$ to $SO_3$, as a parameter of the performance of catalyst, is measured by the following methods.

In a laboratory test, a synthetic gas consisting of 300 ppm of $SO_2$, 1% by volume of CO, 500 ppm of propylene $C_3H_6$ and 5% by volume of $O_2$ is used, and the concentration of $SO_2$ in the gas before and after the catalyst layer is measured by means of a non-dispersive infrared (NDIR) gas analyzer. Thus, the percent of unconverted $SO_2$ is determined.

In a bench test using engine exhaust gases, an exhaust gas from a four-cylinder engine resulting from the use of a low leaded gasoline with a sulfur content of 0.03% by weight is introduced into a catalytic converter after mixing it with secondary air. A condenser which consists of a helically wound Pylex pipe (with an inside diameter of 6 mm) equipped with a sintered glass filter at its inlet is connected to a sampling pipe provided at each inlet and outlet parts of the catalytic converter.

Warm water of 60° – 70° C. is introduced into the outer side of the Pylex pipe of the condenser in order to keep the Pylex pipe and sintered glass filter warm. $SO_3$ and $SO_4^{--}$ mists in the gas are separated by adsorption and condensation by means of the condenser, and the remainder of the gas is passed through a gas-absorbing bottle filled with 3% $H_2O_2$ where the $SO_2$ gas is collected as $H_2SO_4$. At this time, the sample gas is sucked at a constant flow rate by means of a suction pump connected to the rear of the gas-absorbing bottle. The amount of the sample gas is determined by a gas meter. Since the $SO_2$ gas and $SO_4^{--}$ mist are both collected in the form of $H_2SO_4$, it is determined by a filtration method with sulfonazo-III(4,5-dihydroxy-3,6-bis[(2-sulfophenyl)azo]-2,7-naphthalenedisulfonic acid) as an indicator in the presence of isopropyl alcohol using a 1/100 N aqueous solution of barium perchlorate $[Ba(ClO_4)_2]$ [Goksoyr A., Ross K, "Journal Inst. Fuel 35 177–179 (1962)]. The reaction conditions using engine exhausts are as follows:

Composition of the gas at the inlet of the catalyst converter: 0.5 – 0.7% CO, 950 – 1,100 ppm (calculated as methane) HC, and 4.0 – 5.0% $O_2$ Reaction Temperature: 450° C. Space velocity: 36,000 $hr^{-1}$ The sulfur compounds in the gas at the inlet of the catalytic converter consists substantially of $SO_2$, but in the gas at the outlet of the converter, $SO_3$ ($SO_4^{--}$ mist) is present in addition to $SO_2$. However, the total concentration is sometimes lower than the $SO_2$ concentration at the inlet.

Needless to say, in the present invention, catalysts comprising the support substrate and supported thereon both the heavy metal oxide and the noble metal as catalytic substances can be used for purifying waste gases from general industrial processes.

The following Examples and Comparative Examples illustrate the present invention in greater detail. It should be noted, however, that the invention is not limited to these Examples.

EXAMPLE 1

Titanium phosphate was prepared by the following procedure. Hydrochloric acid (500 g) was added to 5 liters of water, and 500 g of titanium tetrachloride was added dropwise at room temperature. After allowing the mixture to stand for 3 hours, a 10% aqueous solution containing 356 g of diammonium hydrogen phosphate was gradually added dropwise to the mixture with thorough stirring. After the formation of a precipitate, the system was allowed to stand at 70° C. for 6 hours. The precipitate was separated by filtration, and washed with water by means of a centrifugal separator until there was no chlorine ion in the filtrate. It was dried at 120° C., and then calcined at 550° C. for 3 hours. The resulting powder had the composition $2TiO_2.P_2O_5$ and a surface area, measured by the BET method, of 72 $m^2/g$.

On the other hand, 200 g of titanium phosphate obtained by the method set forth above was added to an aqueous solution prepared by dissolving 152 g of copper nitrate in 200 cc of water. They were thoroughly kneaded by means of a kneader, and the kneaded mixture was fed into a stainless steel tabletting plate to form molded catalyst tablets with a size of 4 mm in diameter and 4 mm in length. They were dried, and then calcined at 450° C. The titanium phosphate/CuO weight ratio of the resulting catalyst was 80/20.

EXAMPLE 2

200 g of a titanium phosphate powder obtained by the process shown in Example 1 was kneaded with 210 cc of water using a kneader, and the kneaded mixture molded into tablets with a size of 4 mm in a diameter and 4 mm in length using a tabletting plate. The tablets were dried, and calcined.

100 g of the resulting catalyst tablets were fully dipped in and contacted with an aqueous solution of 76 g of copper nitrate in 100 cc of water, and then the solution evaporated by dryness. The impregnated tablets were calcined at 450° C. for 6 hours to form a catalyst.

EXAMPLE 3

Titanium phosphate was prepared in the same way as in Example 1 except that the amounts of the starting materials were changed. The materials used were 500 g of titanium chloride, and 608 g of 85% phosphoric acid. The resulting titanium phosphate powder had the composition $TiO_2.P_2O_5$ and a surface area, measured by the BET method, of 15 $m^2/g$.

200 g of the resulting powder was well kneaded with an aqueous solution of 152 g of copper nitrate in 180 cc of water by means of a kneader, and in the same way as in Example 1, catalyst tablets with a size of 4 mm in diameter and 4 mm in length were prepared.

COMPARATIVE EXAMPLE 1

A solution of 0.532 g of hexachloroplatinic acid in 70 cc of water was impregnated in 100 g of commercially available spherical activated alumina particles (with an average particle diameter of 4 mm and a surface area, measured by the BET method, of 120 $m^2g$) as a carrier. After drying, the impregnated alumina was calcined at 450° C. for 3 hours in the presence of a hydrogen stream. The amount of the platinum supported was 0.2% by weight.

COMPARATIVE EXAMPLE 2

A solution of 60.8 g of copper nitrate in 60 cc of water and impregnated in 80 g of the same spherical activated alumina particles as used in Comparative Example 1, followed by drying and then calcining at 450° C. for 6 hours.

COMPARATIVE EXAMPLE 3

A platinum-supported catalyst was prepared in the same way as in Comparative Example 1 except that 100 g of a silica carrier ($SiO_2$ content 76% by weight; BET surface area 100 $m^2/g$; size 4 mm in diameter and 4 mm in length) was used instead of the activated alumina carrier used in Comparative Example 1.

COMPARATIVE EXAMPLE 4

A copper-supported catalyst was prepared in the same way as in Comparative Example 2 except that the same silica carrier as used in Comparative Example 3 was used.

EXAMPLE 4

A laboratory activity test was performed in the following manner on each of the catalysts obtained in Examples 1 to 3 and Comparative Examples 1 to 4.

15 cc of each of the catalysts was packed in a stainless steel reaction tube having an inside diameter of 20 mm, and a synthetic gas of the following composition similar to an exhaust gas from a boiler was introduced into the catalyst layer at a flow rate of 2.5 liters/min. (SV=10,000 hr$^{-1}$) while adding ammonia thereto. The relation between the reaction temperature and the NO$_x$ conversion (%) was determined. The NO$_x$ analyzer used was of a chemiluminescent type (CLD-75 Type by Yanagimoto Co., Ltd.).

| Composition of the synthetic gas | |
|---|---|
| NO | 300 ppm |
| SO$_2$ | 800 ppm |
| O$_2$ | 4 % |
| CO$_2$ | 10 % |
| H$_2$O | 10 % |
| NH$_3$ | 300 ppm |
| N$_2$ | remainder |

The results obtained are shown in Table 1. Unless otherwise specified, all figures in the following tables show the conversion of NO$_x$ to N$_2$ by molar percent.

Table 1 shows the noble metal catalyst obtained in Comparative Example 1 particularly has activity at low temperatures, and the catalysts obtained in Examples 1 to 3 and Comparative Example 2 exhibit similar levels of activity. This means that the catalysts of this invention has equivalent levels to the conventional catalysts as regards the conversion of NO$_x$ in the early stage. (The following Examples will demonstrate that in a durability test, the catalysts of this invention retain stable activity over long periods of time without being affected by sulfur compounds).

average, consisted of 300 ppm of NO$_x$, 1,400 ppm of SO$_x$, 3.5% of O$_2$, 13.5% of CO$_2$, 14% of H$_2$O and the remainder being N$_2$. Ammonia was added in a concentration of 300 ppm.

The space velocity was 10,000 hr$^{-1}$, and the reaction temperature was 230° C. in Comparative Example 1, and 330° C. in other examples. The results obtained are shown in Table 2.

Table 2

| Catalyst | Temperature (° C.) | Time (hrs.) | | | | | |
|---|---|---|---|---|---|---|---|
| | | 0 | 100 | 200 | 500 | 1000 | 1500 |
| Example 1 | 330 | 94 | 94 | 93 | 94 | 93 | 92 |
| Example 2 | " | 93 | 93 | 93 | 93 | 92 | 92 |
| Example 3 | " | 86 | 86 | 86 | 84 | 85 | 84 |
| Comparative Example 1 | 230 | 97 | 44 | 28 | — | — | — |
| Comparative Example 2 | 330 | 91 | 76 | 53 | 39 | — | — |

Table 2 demonstrates that the catalyst of this invention retains stable activity even after a lapse of 1,500 hours, whereas an abrupt deterioration in activity was observed in the catalysts obtained in Comparative Examples Examples 1 and 2 after the testing showed the build-up of sulfur and the presence of aluminum sulfate. Changes in the distribution of pores, particularly the decrease of micropores, were also observed.

EXAMPLES 6 to 15

Catalysts comprising various catalytic substances supported were prepared in the same way as in Exam- Table 1

| Catalyst and Composition | | Temperature (° C.) | | | | | | | |
|---|---|---|---|---|---|---|---|---|---|
| | | 150 | 200 | 225 | 250 | 300 | 325 | 350 | 400 |
| Example 1 | TP*:CuO = 80:20 | — | — | — | 72 | 86 | 94 | 92 | 88 |
| Example 2 | TP*:CuO = 80:20 | — | — | — | 70 | 85 | 94 | 92 | 85 |
| Example 3 | TP*:CuO = 80:20 | — | — | — | 62 | 78 | 88 | 86 | 82 |
| Comparative Example 1 | Al$_2$O$_3$:Pt = 99.8:0.2 | 45 | 89 | 96 | 91 | 20 | — | — | — |
| Comparative Example 2 | Al$_2$O$_3$:CuO = 80:20 | — | — | — | 74 | 84 | 92 | 88 | 82 |
| Comparative Example 3 | SiO$_2$:Pt = 99.8:9.2 | 10 | 27 | 44 | 61 | 57 | — | — | — |
| Comparative Example 4 | SiO$_2$:CuO = 80:20 | — | — | — | 14 | 21 | 28 | 26 | 20 |

*Titanium phosphate will be referred to hereinbelow as TP.

EXAMPLE 5

In order to perform a durability test, 45 cc of each of the catalysts obtained in Examples 1 to 3 and Comparative Examples 1 and 2 was used to treat a boiler exhaust gas having a high sulfur content. The exhaust gas, after removing a greater part of the soot therein by means of an Alundum layer and a glass wool layer, was introduced into the catalyst layer. The exhaust gas, on an ple 1 using the titanium phosphate powder shown in Example 1.

In Examples 6 to 8, one source of heavy metal was used, and in Examples 9 to 15, two sources of heavy metal were used. The compositions of the resulting catalysts and the results obtained are shown in Table 3. It can be seen from Table 3 that in all cases, favorable results were obtained.

Table 3

| Catalyst | Composition | Temperature (° C.) | | | | |
|---|---|---|---|---|---|---|
| | | 250 | 300 | 35 | 350 | 400 |
| Example 6 | TP:V$_2$O$_5$ = 80:20 | 90 | 94 | 95 | 93 | 84 |
| Example 7 | TP:Fe$_2$O$_3$ = 80:29 | 67 | 84 | 87 | 84 | 74 |
| Example 8 | TP:MnO$_2$ = 80:20 | 67 | 75 | 86 | 86 | 87 |
| Example 9 | TP:V$_2$O$_5$:SnO$_2$ = 80:10:10 | 86 | 92 | 95 | 93 | 85 |
| Example 10 | TP:V$_2$O$_5$:CoO = 80:10:10 | 86 | 93 | 94 | 92 | 87 |
| Example 11 | TP:V$_2$O$_5$:Nb$_2$O$_3$ = 80:10:10 | 82 | 88 | 90 | 90 | 83 |
| Example 12 | TP:V$_2$O$_5$:WO$_3$ = 80:10:10 | 77 | 87 | 92 | 88 | 87 |
| Example 13 | TP:CuO:NiO = 80:10:10 | 81 | 90 | 93 | 90 | 84 |
| Example 14 | TP:CuO:Cr$_2$O$_3$ = 80:10:10 | 73 | 89 | 92 | 88 | 82 |
| Example 15 | TP:CuO:ZnO = 80:10:10 | 72 | 91 | 91 | 85 | 80 |

EXAMPLE 16

A durability test was carried out in the same way as in Example 5 on the catalysts obtained in Examples 6 and 7 using boiler exhaust gases. At the end of 1,500 hours, the $NO_x$ conversion was 93% for Example 6, and 83% for Example 7. It was thus seen that same as Examples 1, 2 and 3, the catalysts retained stable activities.

EXAMPLES 17, 18 and 19

Catalysts containing CuO, $V_2O_5$ or $Fe_2O_3$ in an amount of 0, 1, 2, 10, 30, 50, 65, 70, 90 and 100% by weight were prepared in the same way as in Examples 1, 6 and 7 except that the amounts of the catalytic substances were changed. Activity test was performed at 325° C. using these catalysts in the same way as in Example 4. The results are shown in Table 4. It can be seen from Table 4 that catalysts containing 10 to 65% by weight of heavy metal oxides, that is, catalysts comprising about 10 to 200 parts by weight, per 100 parts by weight of a support substrate (titanium phosphate), of heavy metal oxides supported thereon are particularly suitable.

phosphoric acid was added dropwise. The mixed solution was aged at 80° C. for 5 hours.

The resulting titanium phosphate gel was filtered, washed with water, dried at 110° C., again washed with water, and then calcined at 570° C. for 3 hours. The resulting powder had a $TiO_2/P_2O_5$ molar ratio of 2, a bulk density of 0.155 g/cc, a pore volume of 4.14 cc/g, and a surface area of 63.3 m$^2$/g. An X-ray diffraction analysis of this powder showed that it was amorphous.

600 g of oxalic acid was dissolved in 1 liter of water, and 276 g of ammonium metavanadate was added. To the resulting aqueous solution was added 500 g of the resulting titanium phosphate powder to form a slurry. The slurry was added dropwise in a thin layer to a stainless steel rotary drum having a diameter of 300 mm and a length of 40 mm equipped with a heating device. The resulting dried powder was calcined at 240° C. for 3 hours. Water was added to the resulting powder, and they were kneaded well by a kneader. The kneaded mixture was extruded into pellets each having a diameter of 3 mm and a length of 3 mm. The pellets were dried at 110° C. for 6 hours, and then calcined in air at 450° C. for 6 hours. A catalyst was obtained which had a titanium phosphate/$V_2O_5$ ratio of 70/30 in weight as oxides.

Table 4

| Catalyst | | Temperature (° C.) | Proportion of heavy metal in the catalyst (%) | | | | | | | | |
|---|---|---|---|---|---|---|---|---|---|---|---|
| | | | 0 | 1 | 2 | 10 | 30 | 50 | 65 | 70 | 90 | 100 |
| Example 17 | TP:CuO | 325 | 35 | 70 | 77 | 93 | 94 | 92 | 90 | 88 | 65 | 60 |
| Example 18 | TP:$V_2O_5$ | " | 35 | 77 | 82 | 95 | 95 | 94 | 93 | 92 | 72 | 66 |
| Example 19 | TP:$Fe_2O_3$ | " | 35 | 64 | 70 | 87 | 86 | 83 | 81 | 78 | 58 | 52 |

EXAMPLE 20

The catalysts obtained in Examples 1, 6 and 7 and Comparative Examples 1 and 2 were examined for their ability to oxidize $SO_2$. A synthetic exhaust gas having the same composition as that used in Example 4 except that it did not contain $NH_3$ was introduced into a catalyst layer, and the concentration of $SO_2$ in the gas at the inlet and the outlet of the catalyst layer was measured. The conversion of $SO_2$ was then calculated. The results are shown in Table 5.

Table 5

| Catalyst | Reaction temperature (° C.) | $SO_2$ conversion (%) |
|---|---|---|
| Example 1 | 325 | 6 |
| Example 7 | 325 | 2 |
| Example 8 | 325 | 5 |
| Comparative Example 1 | 225 | 30 |
| Comparative Example 2 | 325 | 22 |

The results shown in Table 5 demonstrate that the catalysts of this invention has extremely low ability to oxidize $SO_2$ to $SO_3$.

EXAMPLE 21

Titanium phosphate was prepared by the following procedure.

300 g of 98% sulfuric acid was added to 6 liters of water, and 760 g of titanium tetrachloride was added gradually with stirring and ice cooling. The resulting solution was maintained at 80° C., and then, an aqueous solution prepared by diluting 461 g of 85% ortho-

EXAMPLE 22

Water was added to 500 g of the titanium phosphate powder obtained in Example 21, and they were kneaded well by a kneader. The kneaded mixture was extruded into pellets each having a diameter of 3 mm and a length of 3 mm, dried at 110° C. for 6 hours, and then calcined in air at 450° C. for 6 hours.

30 g of oxalic acid was dissolved in 50 cc of water, and 13.8 g of ammonium metavandate was added. To the resulting aqueous solution was added 100 cc (43 g) of the resulting titanium phosphate pellets. The solution was concentrated to dryness, and the impregnated pellets were calcined at 450° C. for 6 hours. A catalyst was obtained which had a titanium phosphate/$V_2O_5$ ratio of 80/20 by weight as oxides.

EXAMPLE 23

Titanium phosphate was prepared in the same way as in Example 21 except that the amounts of the starting materials were changed. The starting materials were 760 g of titanium tetrachloride and 660 g of 85% orthophosphoric acid. The resulting titanium phosphate powder had a $TiO_2/P_2O_5$ molar ratio of 1.4, a bulk density of 0.198 g/cc, a pore volume of 2.64 cc/g, and a surface area of 58.5 m$^2$/g. A catalyst was prepared in the same way as in Example 21 using the resulting titanium phosphate as a support substrate.

EXAMPLE 24

Titanium phosphate was prepared in the same way as in Example 21 except that the amounts of the starting materials were changed. The starting materials were 760 g of titanium tetrachloride and 369 g of 85% orthophosphoric acid. The resulting titanium phosphate powder had a $TiO_2/P_2O_5$ molar ratio of 2.5, a bulk density of 0.185 g/cc, a pore volume of 3.02 cc/g, and a surface area of 59.4 m²/g. An X-ray diffraction analysis showed that it was amorphous. Using the resulting titanium phosphate as a support substrate, a catalyst was prepared in the same way as in Example 21.

EXAMPLE 25

A laboratory acitvity test was performed by the following procedure on each of the catalysts obtained in Examples 21 to 24.

15 cc of each of the catalysts was packed in a stainless steel reaction tube with an inside diameter of 20 mm immersed in a molten salt bath. A synthetic gas of the following composition similar to a boiler exhaust gas was introduced into a catalyst layer at a flow rate of 2.5 liters/min. (SV=10,000 hr$^{-1}$) while adding ammonia thereto.

| Composition of Synthetic Gas | |
|---|---|
| NO | 200 ppm |
| $NH_3$ | 200 ppm |
| $SO_2$ | 800 ppm |
| $O_2$ | 4 % by volume |
| $CO_2$ | 10 % by volume |
| $H_2O$ | 10 % by volume |
| $N_2$ | remainder |

The results obtained are shown in Table 6.

Table 6

| Catalyst | Temperature (° C.) | | | | |
|---|---|---|---|---|---|
| | 200 | 250 | 300 | 350 | 400 |
| Example 21 | 90 | 93 | 95 | 96 | 95 |
| Example 22 | 89 | 92 | 95 | 97 | 96 |
| Example 23 | 86 | 89 | 93 | 95 | 97 |
| Example 24 | 89 | 92 | 95 | 97 | 96 |

EXAMPLE 26

In accordance with the procedure set forth in Example 25, the relation between the space velocity (SV) and the $NO_x$ conversion (%) at a reaction temperature of 300° C. was measured. The resuls obtained are shown in Table 7.

Table 7

| Catalyst | SV (hr$^{-1}$) | | | | |
|---|---|---|---|---|---|
| | 3,000 | 5,000 | 10,000 | 20,000 | 30,000 |
| Example 21 | 99 | 98 | 95 | 89 | 72 |
| Example 22 | 99 | 98 | 95 | 88 | 71 |
| Example 23 | 99 | 97 | 93 | 87 | 70 |

It can be seen from Table 7 that the catalysts in accordance with this invention exhibit good activities even at high space velocities.

EXAMPLE 27 to 43

Using the same titanium phosphate powder as used in Example 21, catalysts were prepared in the same way as in Example 21 except that different sources of heavy metal were used.

In Examples 27 to 30, one source of heavy metal was used, and in Examples 31 to 43, two sources of heavy metal were used. As heavy metal sources, Cu, Fe, Co, Mn, Zn, Ni, Sn and Ce were in the form of nitrate salts; Cr and W, in the form of ammonium salts of metal acids; and Ti and Nb in the form of chlorides.

The reaction was carried out in accordance with the procedure set forth in Example 25.

The catalyst ingredients and the results obtained are shown in Table 8.

Table 8

| Ex. | Catalyst composition (weight ratio) | Temperature (° C.) | | | | |
|---|---|---|---|---|---|---|
| | | 200 | 250 | 300 | 350 | 400 |
| 27 | TP:CuO = 80:20 | 72 | 82 | 89 | 96 | 95 |
| 28 | TP:$Fe_2O_3$ = 80:20 | 70 | 75 | 85 | 93 | 92 |
| 29 | TP:$MnO_2$= 80:20 | 70 | 73 | 84 | 92 | 92 |
| 30 | TP:$V_2O_5$:$WO_2$ = 70:20:10 | 88 | 91 | 94 | 95 | 96 |
| 31 | TP:$V_2O_5$:$TiO_2$ = 70:20:10 | 89 | 91 | 95 | 96 | 96 |
| 32 | TP:$V_2O_5$:$SnO_2$ = 70:20:10 | 89 | 91 | 94 | 95 | 94 |
| 33 | TP:$V_2O_5$:CoO = 70:20:10 | 89 | 90 | 94 | 94 | 93 |
| 34 | TP:$V_2O_5$:$MoO_3$ = 70:20:10 | 88 | 91 | 94 | 95 | 96 |
| 35 | TP:$V_2O_5$:$Fe_2O_3$ = 70:20:10 | 87 | 89 | 93 | 95 | 93 |
| 36 | TP:$V_2O_5$:$Cr_2O_3$ = 70:20:10 | 88 | 91 | 93 | 95 | 95 |
| 37 | TP:$V_2O_5$:$Nb_2O_3$ = 70:20:10 | 89 | 92 | 95 | 95 | 94 |
| 38 | TP:$V_2O_5$:$CeO_3$=70:20:10 | 87 | 89 | 93 | 95 | 94 |
| 39 | TP:$V_2O_5$:$MnO_2$ = 70:20:10 | 88 | 89 | 94 | 95 | 94 |
| 40 | TP:CuO:NiO = 80:10:10 | 86 | 91 | 93 | 96 | 95 |
| 41 | TP:CuO:$Cr_2O_3$ = 80:10:10 | 83 | 89 | 93 | 96 | 95 |
| 42 | TP:CuO:ZnO = 80:10:10 | 82 | 88 | 93 | 95 | 95 |
| 43 | TP:CuO:$Fe_2O_3$ = 80:10:10 | 83 | 89 | 93 | 95 | 94 |

EXAMPLE 44

Catalysts containing $V_2O_5$, CuO or $Fe_2O_3$ in an amount of 0, 1, 2, 10, 30, 50, 65, 70, 90 and 100% by weight were prepared in the same way as in Examples 21, 27, and 28 except that the amounts of the catalystic substances were changed. An activity test was performed in the same way as in Examples 25 at 300° C. using these catalysts. The results obtained are shown in Table 9.

It can be seen from Table 9 that catalysts containing 10 to 65% by weight of heavy metal oxides, that is, catalysts containing about 10 to 200 parts by weight per 100 parts by weight of a support substrate (titanium phosphate), of heavy metal oxides supported thereon are especially suitable.

Table 9

| Catalyst | Catalyst composition | Proportion of heavy metal oxide (%) | | | | | | | | | |
|---|---|---|---|---|---|---|---|---|---|---|---|
| | | 0 | 1 | 2 | 10 | 30 | 50 | 65 | 70 | 90 | 100 |
| Example 21 | TP:$V_2O_5$ | 24 | 70 | 77 | 91 | 95 | 90 | 86 | 84 | 60 | 53 |
| Example 27 | TP:CuO | 24 | 64 | 70 | 85 | 87 | 82 | 77 | 75 | 59 | 51 |
| Example 28 | TP:$Fe_2O_3$ | 24 | 55 | 64 | 83 | 84 | 79 | 73 | 71 | 56 | 48 |

EXAMPLES 45 to 50

Catalysts shown in Table 10 were prepared in accordance with the procedure set forth in Example 21 using a slurry consisting of the same titanium phosphate powder as used in Example 21, a powder of $TiO_2$ or $SnO_2$, and an aqueous solution of copper nitrate, ammonium metavanadate or ferric nitrate. An $NO_x$ reducing reaction was carried out in accordance with the procedure of Example 25 using each of these catalysts. The results obtained are shown in Table 10.

Table 10

| Examples | Catalyst composition (weight ratio) (powder):(powder):(solution) | Temperature (°C.) | | | | |
|---|---|---|---|---|---|---|
| | | 200 | 250 | 300 | 350 | 400 |
| 45 | TP:$TiO_2$:CuO = 40: 40 : 20 | 85 | 90 | 93 | 96 | 95 |
| 46 | TP:$SnO_2$:CuO = 40: 40 : 20 | 82 | 88 | 93 | 95 | 95 |
| 47 | TP:$TiO_2$:$V_2O_5$ = 40: 40 : 20 | 89 | 92 | 95 | 96 | 96 |
| 48 | TP:$SnO_2$:$V_2O_5$ = 40: 40:: 20 | 87 | 90 | 93 | 94 | 95 |
| 49 | TP:$TiO_2$:$Fe_2O_3$ = 40: 40 : 20 | 82 | 88 | 91 | 93 | 93 |
| 50 | TP:$SnO_2$:$Fe_2O_3$ = 40: 40 : 20 | 81 | 87 | 92 | 94 | 95 |

EXAMPLES 51 to 55

In Examples 51 to 55, catalysts with a particle size of 8 mm in diameter and 8 mm in length were prepared using the same materials and preparing methods as in Examples 21, 22, 23, 27 and 28 respectively. These catalysts were used for treating boiler exhaust gases, and their durability was tested.

The reactor used had a diameter of about 82 mm, and the amount of the catalysts packed was about 2 liters. After removing about 90% of soot contained in the exhaust gas by an electrostatic precipitator, the exhaust gas was introduced into the catalyst layer. The average gas composition of the exhaust gas was $NO_x$ 200 ppm. $SO_x$ 1,400 ppm, $O_2$ 7% by volume, $CO_2$ 12% by volume, $H_2O$ 14% by volume, the remainder being $N_2$. Ammonia was added in a concentration of 200 ppm. The space velocity was 10,000 $hr^{-1}$, and the reaction temperature was 300° C.

The results obtained are shown in Table 11.

Table 11

| Catalyst | Time (hours) | | | | |
|---|---|---|---|---|---|
| | 0 | 500 | 1000 | 2000 | 3000 |
| Example 51 | 95 | 95 | 95 | 94 | 94 |
| Example 52 | 94 | 94 | 94 | 93 | 93 |
| Example 53 | 92 | 92 | 92 | 92 | 91 |
| Example 54 | 87 | 87 | 87 | 86 | 85 |
| Example 55 | 82 | 82 | 82 | 81 | 81 |

EXAMPLES 56 to 60

The $SO_2$ oxidizing ability of each of the catalysts obtained in Examples 21, 22, 23, 27, and 28 was measured.

A synthetic gas having the same composition as that used in Example 25 except that absence of ammonia was introduced into a catalyst layer at a reaction temperature of 350° C., and a space velocity of 5,000 $hr^{-1}$, and the concentration of $SO_2$ in the gas at the inlet and outlet of the catalyst layer was measured. Then, the conversion of $SO_2$ was calculated. The results obtained are shown in Table 12.

Table 12

| Catalyst | $SO_2$ conversion (%) |
|---|---|
| Example 56 | 2 |
| Example 57 | 1 |
| Example 58 | 1 |
| Example 59 | 6 |
| Example 60 | 5 |

It can be seen from the results shown in Table 12 that the catalysts of this invention exhibit extremely low ability to oxidize $SO_2$ to $SO_3$.

EXAMPLE 61

960 cc of water and 1.02 kg of sodium hydroxide were added to 1.5 kg of aluminum hydroxide (C31, trademark for a product of Sumitomo Chemical Co., Ltd.), and the mixture was heated at 100° C. to form a solution. Then, water was added to form 4.5 liters of an aqueous solution of sodium aluminate.

Separately, 2.12 kg of 98% conc. sulfuric acid and 1 liter of water were added to 1 kg of the same aluminum hydroxide as set forth above, and the mixture was heated at 100° C. to form a solution. Then, water was added to form 3 liters of an aqueous solution of aluminum sulfate. The resulting sodium aluminate solution and the resulting aluminum sulfate solution were separately added dropwise over the course of 1 hour to 7 liters of water being stirred, while maintaining the pH of the mixture at 8.5 to 9.0. The reaction mixture was aged for 1 hour, and then, nitric acid was added to the solution to adjust its pH to 6.0. The resulting aluminum hydroxide was filtered, washed with water, and dried at 150° C. to form boehmite-like aluminum oxide monohydrate.

A 30% by weight aqueous solution of monoammonium phosphate in an amount of 356 g as $P_2O_5$ was added with stirring at room temperature to a 50% by weight aqueous solution of titanium tetrachloride in an amount of 200 g as $TiO_2$. The white precipitate obtained (with a $TiO_2/P_2O_5$ molar ratio of 1/1) was dried at 150° C., and calcined at 500° C. The resulting titanium phosphate had a surface area of 53 $m^2/g$.

1.2 kg of the resulting aluminum oxide monohydrate and 437 g of the calcined titanium phosphate were well kneaded by a kneader using 1.9 liters of water. The mixture was shaped by an extruder, dried at 170° C., and calcined at 1,000° C. for 2 hours to produce a support substrate in the form of pellets with a diameter of 3.1 mm and a length of 5 to 6 mm. The support substrate obtained contained 10.8%, as $TiO_2$, of titanium and 19.2%, as $P_2O_5$, of phosphorus, and had a bulk density of 0.70 g/cc, a surface area of 75 $m^2/g$, and a total pore volume of 0.58 cc/g with the ratio of pores having a diameter of at least 100 A. being 84% based on the total pore volume.

2 g of palladium nitrate powder was heated together with 10 g of oxalic acid and 30 cc of water to form palladium oxalate. 0.25 g, as palladium metal, of the palladium oxalate was placed in an evaporating dish, and water was added to make the total volume 250 cc. A blocked copolymer of propylene oxide (PO) and ethylene oxide (EO) having an average molecular weight of 11,000 and an ethylene oxide content, in the entire molecules, of 80% by weight [a polymeric nonionic surfactant, Pluronic F 88, a product of Asahi Denka Kogyo K.K.)] was added in an amount of 1 g. To the resulting solution was added 500 cc of the support substrate, and they were thoroughly mixed for good impregnation. The solution was concentrated to dryness over a hot water bath, and the resulting catalyst was dried at 150° C., and then calcined in air at 600° C. for 3 hours. The resulting catalyst contained palladium in an amount of 0.0714% by weight.

EXAMPLE 62

Aluminum oxide monohydrate was prepared in the same way as in Example 61. A 10% by weight aqueous solution of titanium tetrachloride containing 300 g, as $TiO_2$, of titanium was reacted with a 10% aqueous solution of monoammonium phosphate containing 213 g, as $P_2O_5$, of phosphorus at 50° C. (the molar ratio of $TiO_2/P_2O_5$ was 2.5/1). The resulting white precipitate was separated by filtration, dried at 150° C., and calcined at 500° C. The calcined product has a surface area of 48 m²/g.

In the same way as in Example 61, a support substrate was prepared which contained 17.5%, as $TiO_2$, of titanium and 12.5%, as $P_2O_5$, of phosphorus and was in the form of pellets with a diameter of 3.1 mm and a length of 5 to 6 mm. The resulting support substrate had a bulk density of 0.69 g/cc, a surface area of 80 m²/g, and a total pore volume of 0.60 cc/g with the ratio of pores having a diameter of at least 100 A. being 88% based on the total pore volume.

Then, 250 cc of an aqueous solution containing palladium chloride in an amount of 0.25 g as palladium metal and hydrochloric acid was placed on an evaporating dish, and 1 g of the same nonionic surfactant as used in Example 61 was added. 500 cc of the support substrate was impregnated with the resulting solution in the same way as in Example 61, followed by concentration to dryness and drying. The resulting product was fitted at the exhaust outlet of a commercially available 4-cylinder 1,800 cc engine, and subjected to reductive calcination at 400° C. for 2 hours with the exhaust gas of the engine. The resulting catalyst contained 0.0724% by weight of palladium.

EXAMPLE 63

Aluminum oxide monohydrate was prepared in the same way as in Example 61. Separately, water was added to 200 g of titanium oxide having a surface area of 8.5 m²/g to form a 50% slurry. Then, 577 g of 85% phosphoric acid was added, and they were well mixed (the molar ratio of $TiO_2/P_2O_5$ being 1/1). Water was removed in a dryer held at 150° C., and the product was then calcined at 950° C. for 3 hours. The product was pulverized by a hammer mill to form a titanium phosphate powder having a surface area of 5 m²/g.

A support substrate in the form of pellets containing 3.6%, as $TiO_2$, of titanium and 6.4%, as $P_2O_5$, of phosphorus and having a diameter of 3 mm and a length of 5 to 6 mm was prepared from the resulting aluminum oxide monohydrate and the titanium phosphate powder in the same way as in Example 61. The resulting support substrate had a bulk density of 0.64 g/cc, a surface area of 100 m²/g, and a total pore volume of 0.66 cc/g with the ratio of pores having a diameter of at least 100 A being 91% based on the total pore volume.

Then, 250 cc of an aqueous solution containing 0.25 g, as palladium metal, of palladium nitrate and nitric acid was placed in an evaporating dish, and 1 g of the same nonionic surfactant as used in Example 61 was added. Then, 500 cc of the support substrate was impregnated with the resulting solution in the same way as in Example 61, followed by concentration to dryness, drying, and calcination. The resulting catalyst contained palladium in an amount of 0.0781% by weight.

EXAMPLE 64

A 10% by weight aqueous solution of titanium tetracloride containing 13.4 g, as $TiO_2$, of titanium was mixed and reacted with stirring with 50 cc of 28% ammonia solution. The resulting titanium hydroxide was filtered, and washed with water. All of the washed titanium hydroxide was placed in a beaker, and 150 cc of water was added. Under heat, 50 g of oxalic acid was added to form an aqueous solution of titanium oxalate. One gram of the same nonionic surfactant as used in Example 61 was added to the aqueous solution to form 250 cc of a solution. All of the resulting solution was placed in an evaporating dish. Then, 500 cc of a cylindrical activated alumina carrier (made by American Cyanamid Co.) having a size of 3.1 mm in diameter and 5 – 6 mm in length, a bulk density of 0.67 g/cc, a surface area of 100 m²/g and a total pore volume of 0.65 cc/g with the ratio of pores having a diameter of at least 100 A. being 95% based on the total pore volume was immersed in the solution within the evaporating dish. After thorough mixing, the solution was concentrated to dryness, and the impregnated carrier was dried at 100° C., and heated in air to 400° C. to decompose titanium oxalate. 250 cc of an aqueous solution containing phosphoric acid with a phosphorus content, as $P_2O_5$, of 23.8 g and 1 g of the same nonionic surfactant as set forth above was placed in an evaporating dish, and the titanium-supported alumina carrier obtained above was added to the solution, followed by concentration to dryness. The impregnated carrier was dried at 100° C., and calcined in air at 1,000° C. for 2 hours. Thus, an alumina carrier containing 3.6% by weight, as $TiO_2$, of titanium and 6.4% by weight, as $P_2O_5$, as phosphorus was prepared.

A catalyst containing palladium supported in an amount of 0.0694% by weight was produced using the resulting support substrate in the same way as in Example 63.

EXAMPLE 65

One gram of the same nonionic surfactant as used in Example 61 was dissolved in 250 cc of an aqueous solution of titanium sulfate containing 11.2 g, as $TiO_2$, of titanium. 500 cc of a spherical activated alumina carrier (SCS-79, trademark for a product of Rhone Progil) having an average particle diameter of 3.3 mm, a bulk density of 0.66 g/cc, a surface area of 95 m²/g and a total pore volume of 0.66 cc/g with the ratio of pores having a diameter of at least 100 A. being 83% based on the total pore volume was added to the resulting solution, followed by concentration to dryness. The impregnated carrier was dried, and then heated in air at 600° C. to decompose titanium sulfate.

The resulting titanium-supported alumina carrier was added to 250 cc of an aqueous solution containing 1 g of the non-ionic surfactant described above and diammonium phosphate [$(NH_4)_2HPO_4$] containing 9.9 g, as $P_2O_5$, of phosphorus, followed by concentration to dryness. The impregnated carrier was dried, and calcined in air at 1,000° C. for 2 hours to form a support substrate containing 3.2% by weight, as $TiO_2$, of titanium and 2.8% by weight, as $P_2O_5$, of phosphorus.

The catalyst containing palladium supported in an amount of 0.0714% by weight was prepared in the same way as in Example 61 using the resulting support substrate.

EXAMPLE 66

An extruded support substrate was prepared in the same way as in Example 63. A support substrate containing titanium and phosphorus was prepared in the same way as in Example 64 using 500 cc of the support substrate. Then, in the same way as in Example 63, a catalyst containing palladium supported in an amount of 0.0704% by weight was prepared.

COMPARATIVE EXAMPLE 5

A catalyst containing palladium supported in an amount of 0.0757% by weight was prepared in the same way as in Example 61 using the same spherical activated alumina carrier as described in Example 65 as a support substrate.

EXAMPLE 67

Aluminum oxide monohydrate was prepared in the same way as in Example 61.

Separately, titanium phosphate having a surface area of 4 $m^2/g$ and a titanium oxide/phorphorus pentoxide molar ratio of 2/1 was prepared in the same way as in Example 63 using titanium hydroxide and monoammonium phosphate ($NH_4H_2PO_4$).

A support substrate containing 10% by weight of the titanium phosphate was prepared in the same way as in Example 61 using these materials. The resulting support substrate contained 5.3%, as $TiO_2$, of titanium and 4.7%, as $P_2O_5$, of phosphorus, and had a particle size of 3 mm in diameter and 5 to 6 mm in length, a bulk density of 0.62 g/cc, a surface area of 95 $m^2/g$, and a total pore volume of 0.67 cc/g with the ratio of pores having a diameter of at least 100 A. being 95% based on the total pore volume.

250 cc of an aqueous solution of chloroplatinic acid in an amount of 0.05 g as platinum metal was placed in an evaporating dish, and 1 g of the same nonionic surfactant as used in Example 61 was dissolved in it. 500 cc of the support substrate was impregnated with the resulting solution, followed by concentration to dryness, and drying at 150° C. The dried product was then immersed in 250 cc of nitric acid-containing aqueous solution containing 0.15 g, as palladium metal, of palladium nitrate and 1 g of the same nonionic surfactant as described above, followed by concentration to dryness, and then drying at 150° C. The dried product was reductively calcined at 400° C. for 2 hours in a stream of a mixture of nitrogen and hydrogen with a hydrogen content of 5%. The resulting catalyst contained palladium supported in an amount of 0.0483% by weight and platinum supported in an amount of 0.0161% by weight.

EXAMPLE 68

A catalyst containing platinum supported in an amount of 0.0138% by weight and palladium supported in an amount of 0.0416% by weight was prepared in the same way as in Example 67 using 500 cc of a support substrate produced in the same way as in Example 64.

COMPARATIVE EXAMPLE 6

A catalyst containing platinum supported in an amount of 0.0149% by weight and palladium supported in an amount of 0.0447% by weight was prepared in the same way as in Example 67 using the same cylindrical activated alumina carrier as described in Example 64 as the support substrate.

COMPARATIVE EXAMPLE 7

250 cc of an aqueous solution of chloroplatinic acid in an amount of 0.25 g as platinum metal was placed in an evaporating dish, and 1 g of the same nonionic surfactant as used in Example 61 was added. 500 cc of the same activated alumina carrier was used in Example 64 was used as a support substrate, and immersed in the resulting solution, followed by concentration to dryness, and then drying at 150° C. The dried product was reductively calcined in the same way as in Example 67. The resulting catalyst contained platinum supported in an amount of 0.0746% by weight.

EXAMPLE 69

The catalysts obtained in Examples 61 to 68 and Comparative Examples 5 to 7 were each tested for their activity of oxidizing $SO_2$ to $SO_3$.

In this test, 10 cc of each of the catalysts was packed in a stainless steel reaction tube with an inside diameter of 18 mm, and a gaseous mixture consisting of 300 ppm of sulfur dioxide gas ($SO_2$), 1% by volume of carbon monoxide (CO), 500 ppm of propylene 5% by volume of oxygen and the remainder being nitrogen was introduced into the reaction tube at a temperature of 450° C. and a space velocity of 15,000 $hr^{-1}$ (under these conditions, the conversion of $SO_2$ appears to be the highest in view of the rate of reaction of the sulfur dioxide gas and the equilibrium relation between sulfur dioxide and sulfur trioxide ($SO_3$)). It was maintained for 20 to 60 minutes until a steady state was reached. When the steady state was reached, the concentration of $SO_2$ was measured by means of a non-dispersive infrared gas analyzer (NDIR method). The results obtained are shown in Table 13.

Table 13

| Catalyst | $SO_2$ Conversion (%) |
|---|---|
| Example 61 (Pd) | 25 |
| Example 62 (Pd) | 26 |
| Example 63 (Pd) | 22 |
| Example 64 (Pd) | 21 |
| Example 65 (Pd) | 24 |
| Example 66 (Pd) | 19 |
| Comparative Example 5 (Pd) | 52 |
| Example 67 (Pt/Pd = ⅓) | 57 |
| Example 68 (Pt/Pd = ⅓) | 55 |
| Comparative Example 6 (Pt/Pd = ⅓) | 80 |
| Comparative Example 7 (Pt) | 95 |

Table 13 demonstrates that the catalysts of this invention have low ability to oxidize $SO_2$ as compared with the comparative catalysts containing the same catalytic substances.

EXAMPLE 70

The catalysts obtained in Examples 61 to 68 and Comparative Examples 5 to 7 were tested for their activities on carbon monoxide (CO) and hydrocarbons (HC) in the initial stage, and also for their activities after heat treatment.

In these tests, 10 cc of each of the catalysts was packed in a stainless steel reaction tube with an inside diameter of 18 mm, and a gaseous mixture consisting of 1% by volume of CO, 500 ppm of propylene, 5% by volume of oxygen, 10% by volume of steam and the remainer being nitrogen was passed into the reaction tube while maintaining the temperature at the gas-introducing inlet of the reaction tube at 200° to 300° C. and the space velocity at 15,000 hr$^{-1}$. When a steady state was reached, the flow gas was analyzed at each of the prescribed measuring temperatures indicated in Table 14 for CO by means of a non-dispersive infrared gas analyzer (NDIR method), and for propylene by means of a flame ionization detector gas analyzer (FID method).

The test for activity after heat treatment (shrunk activity) means the above-described test performed after maintaining the catalysts in air at 980° C. for 24 hours.

The results are shown in Table 14. The figures in the table show the conversion (%) of CO and HC.

EXAMPLE 71

The catalysts obtained in Examples 61 to 68 and Comparative Examples 5 to 7 were tested for their oxidation activities on $SO_2$, CO and HC present in an engine exhaust gas and for their stability of activities.

25 cc of each of the catalysts was packed in a stainless steel reaction tube with an inside diameter of 30 mm. The temperature at the gas-introducing inlet of the reaction tube was adjusted to 450° C. by electrical heating. A commercially available 4-cylinder 1,600 cc engine was operated at a speed of 1,700 rpm and a boost pressure of 450 mmHg using a low leaded gasoline (lead content 0.03 g/gallon). The exhaust gas generated was mixed with a required amount of secondary air. The resulting gaseous mixture was fed into the reaction tube by a blower at a rate of 15 liters/min. at room temperature. The activity of each catalyst in the initial stage and after 300 hours was measured.

$SO_2$ and $SO_3$ were analyzed by the method described hereinabove, and HC, CO and oxygen were analyzed by means of MEXA-18 type analyzer (a product of Horiba Seisakusho).

The gas at the inlet consisted of 0.5 to 0.7% by volume of CO, 950 to 1,100 ppm of hydrocarbons (calculated on methane), 12 to 15 ppm of $SO_2$, 4 to 5% of oxygen and the remainder composed mainly of carbon dioxide, nitrogen and water. The results obtained are shown in Table 15.

In Table 15, $SO_2$ detected (ppm) and $SO_3$ detected (ppm) refer to the concentrations of $SO_2$ and $SO_3$ in the outlet gas. The gas before passageway of the catalyst Table 14

| Catalyst | Condition | 200° C. HC | 200° C. CO | 210° C. HC | 210° C. CO | 225° C. HC | 225° C. CO | 240° C. HC | 240° C. CO | 250° C. HC | 250° C. CO | 260° C. HC | 260° C. CO | 300° C. HC | 300° C. CO |
|---|---|---|---|---|---|---|---|---|---|---|---|---|---|---|---|
| Example 61 | Fresh | 0 | 4 | 2 | 20 | 81 | 99 | 95 | 100 | 98 | 100 | — | — | — | — |
|  | Shrunk | — |  | 0 | 14 | 76 | 95 | 94 | 100 | 98 | 100 |  |  |  |  |
| Example 62 | Fresh | 0 | 5 | 2 | 24 | 77 | 96 | 94 | 100 | 98 | 100 | — | — | — | — |
|  | Shrunk | — |  | 0 | 13 | 73 | 92 | 94 | 100 | 98 | 100 |  |  |  |  |
| Example 63 | Fresh | 0 | 5 | 2 | 26 | 88 | 100 | 95 | 100 | 78 | 100 | — | — | — | — |
|  | Shrunk | — |  | 0 | 11 | 79 | 98 | 94 | 100 | 98 | 100 |  |  |  |  |
| Example 64 | Fresh | 0 | 7 | 9 | 33 | 85 | 100 | 95 | 100 | 98 | 100 | — | — | — | — |
|  | Shrunk | — |  | 0 | 11 | 82 | 99 | 94 | 100 | 98 | 100 |  |  |  |  |
| Example 65 | Fresh | 0 | 6 | 2 | 25 | 79 | 99 | 96 | 100 | 98 | 100 | — | — | — | — |
|  | Shrunk | — |  | 0 | 12 | 75 | 97 | 94 | 100 | 98 | 100 |  |  |  |  |
| Example 66 | Fresh | 0 | 4 | 0 | 19 | 77 | 96 | 94 | 100 | 98 | 100 | — | — | — | — |
|  | Shrunk | — |  | 0 | 9 | 73 | 91 | 94 | 100 | 98 | 100 |  |  |  |  |
| Comparative Example 5 | Fresh | 0 | 12 | 10 | 40 | 82 | 97 | 95 | 100 | 98 | 100 | — | — | — | — |
|  | Shrunk | — |  | 0 | 15 | 81 | 96 | 95 | 100 | 98 | 100 |  |  |  |  |
| Example 67 | Fresh | — |  | 0 | 13 | 48 | 86 | 95 | 100 | 98 | 100 | — | — | — | — |
|  | Shrunk |  |  | 0 | 9 | 33 | 72 | 95 | 100 | 98 | 100 |  |  |  |  |
| Example 68 | Fresh |  |  | 0 | 18 | 66 | 89 | 95 | 100 | 98 | 100 | — | — | — | — |
|  | Shrunk |  |  | 0 | 11 | 57 | 82 | 94 | 100 | 97 | 100 |  |  |  |  |
| Comparative Example 6 | Fresh | 0 | 8 | 0 | 15 | 70 | 92 | 96 | 100 | 98 | 100 | — | — | — | — |
|  | Shrunk | 0 | 9 | 0 | 22 | 71 | 91 | 97 | 100 | 98 | 100 |  |  |  |  |
| Comparative Example 7 | Fresh | 0 | 19 | 11 | 76 | 95 | 100 | 98 | 100 | — |  | — |  | — |  |
|  | Shrunk | — |  | — |  | — |  | — |  | 0 | 0 | 0 | 8 | 98 | 100 |

Table 14 demonstrates that the catalysts of this invention exhibit almost equivalent activities on HC and CO as compared with the comparative catalysts containing as the support substrate an alumina carrier regarded as the best conventional carrier for complete oxidation catalysts.

(gas at the inlet) did not contain $SO_3$. The total recovery ratio (balance) refers to the ratio of the total concentration of $SO_2$ and $SO_3$ in the gas which passed through the catalyst layer based on the concentration of $SO_2$ in the gas at the inlet. Figures of less than 100% mean that sulfur was absorbed in the catalyst. $SO_2$ recovery ratio and $SO_3$ recovery ratio are the percentages of $SO_2$ and $SO_3$ respectively based on the sulfur moiety of the inlet gas which are calculated on the basis of the $SO_2$ detected and $SO_3$ detected.

Table 15

| Catalyst | SO₂ detected (ppm) | SO₃ detected (ppm) | Total recovery ratio (Balance) (%) | SO₂ recovery ratio (%) | SO₃ recovery ratio (%) | Conversion (%) HC Fresh | Conversion (%) HC After 300 hrs. | Conversion (%) CO Fresh | Conversion (%) CO After 300 hrs. |
|---|---|---|---|---|---|---|---|---|---|
| Example 61 | 11.9 | 0.4 | 94 | 91 | 3 | 85 | 83 | 97 | 97 |
| Example 62 | 11.4 | 0.8 | 94 | 88 | 6 | 85 | 83 | 97 | 96 |
| Example 63 | 11.5 | 0.8 | 98 | 92 | 6 | 86 | 83 | 97 | 96 |
| Example 64 | 11.4 | 0.9 | 95 | 88 | 7 | 85 | 83 | 97 | 96 |
| Example 65 | 11.1 | 0.9 | 94 | 87 | 7 | 85 | 82 | 97 | 96 |
| Example 66 | 11.8 | 0.5 | 95 | 91 | 4 | 86 | 83 | 98 | 97 |
| Comparative Example 5 | 7.5 | 1.5 | 73 | 61 | 12 | 87 | 82 | 98 | 95 |
| Example 67 | 7.0 | 3.2 | 80 | 55 | 25 | 86 | 84 | 98 | 97 |
| Example 68 | 7.9 | 2.9 | 82 | 60 | 22 | 86 | 85 | 98 | 97 |
| Comparative Example 6 | 3.7 | 4.3 | 63 | 29 | 34 | 87 | 85 | 97 | 97 |
| Comparative Example 7 | 1.5 | 6.2 | 61 | 12 | 49 | 88 | 86 | 98 | 97 |

Table 15 demonstrates that when only palladium was used as a catalytic substance, the catalysts of this invention (Examples 61 to 66) exhibited lower rate of oxidation of $SO_2$ to $SO_3$ than the catalyst of Comparative Example 5 as was reflected in the high $SO_2$ concentration in the outlet gas, and that their activity to oxidize HC and CO was not at all impeded. It is also seen that when both palladium and platinum were used as catalytic substances, the catalysts of this invention (Examples 67 and 68) exhibited lower rate of oxidation of $SO_2$ to $SO_3$ than the catalyst of Comparative Example 6 as reflected in the high $SO_2$ concentration in the outlet gas, and their activity to oxidize HC and CO was not at all impeded. Furthermore, it can be seen that their oxidation activity was superior to the catalyst of Comparative Example 5 containing only palladium as a catalytic substance in durability after 300 hours.

In the Comparative Examples, the values of the total recovery ratio (balance) were low. This is considered to be due to the fact that oxidation to $SO_3$ proceeded, and it was absorbed to the catalyst. Hence, it can be said that catalysts having lower recovery ratios have higher activity to convert $SO_2$ to $SO_3$.

EXAMPLE 72

69 g of ammonium metavanadate was dissolved in a solution of 150 g of oxalic acid in 250 cc of water. 500 cc of a support substrate prepared in the same way as in Example 62 was immersed in the resulting aqueous solution, followed by concentration to dryness. The impregnated support substrate was dried at 120° C. for 4 hours, and calcined at 450° C. for 6 hours. The amount of vanadium pentoxide supported on the support substrate was 13.4% by weight. Using the vanadium pentoxide-supported composition, a catalyst was prepared in the same way as in Example 61 which contained palladium support in an amount of 0.0641% by weight. Calcination after supporting palladium was carried out in air at 500° C. for 2 hours.

EXAMPLE 73

25.5 g of chromium nitrate and 52 g of ammonium bichromate were placed in a 2-liter beaker, and 750 cc of water was added. The resulting aqueous solution was maintained at 85° C., and 500 cc of a support substrate produced in the same way as in Example 62 was immersed in it. The entire solution was allowed to stand while occasionally stirring it to deposit the chromium compound. Then, the impregnated support substrate was withdrawn, air dried, dried at 120° C. for 2 hours, and then calcined in air at 600° C. for 4 hours. The amount of chromium oxide supported on the substrate was 11% by weight. Using the resulting chromium oxide-supported composition, a catalyst containing palladium supported in an amount of 0.0652% by weight was prepared in the same way as in Example 61.

EXAMPLE 74

A catalyst containing palladium supported in an amount of 0.114% by weight was prepared in the same way as in Example 63 using 500 cc of a support substrate produced in the same way as in Example 61.

COMPARATIVE EXAMPLE 8

A catalyst containing vanadium pentoxide and palladium both supported in an amount of 13.6% by weight and 0.0657% by weight respectively was prepared in the same way as in the Example 72 using the same activated alumina carrier as described in Example 64 as a support substrate.

COMPARATIVE EXAMPLE 9

A catalyst containing chromiun oxide and palladium both supported in an amount of 11% by weight and 0.0672% by weight respectively was prepared in the same way as in Example 73 using the same activated alumina carrier as described in Example 64.

COMPARATIVE EXAMPLE 10

A catalyst containing palladium supported in an amount of 0.121% by weight was prepared in the same way as in Example 74 using the same activated alumina carrier as described in Example 65 as a support substrate.

EXAMPLE 75

The catalysts obtained in Examples 72 to 74 and Comparative Examples 8 to 10 were tested for their activity to oxidize CO and $SO_2$ in an exhaust gas from a heating furnace containing carbon monoxide (CO) and sulfuric dioxide gas ($SO_2$).

In this test, a gaseous mixture consisting of 1% by volume CO, 500 ppm of $SO_2$, 2.5% by volume of $O_2$, 12% by volume of $CO_2$, 12% by volume of $H_2O$, 200 ppm of NO and the remainder being nitrogen was introduced into a stainless steel reaction tube with an inside diameter of 18 mm packed with 20 cc of each of the catalysts, at a temperature of 200° to 300° C. and a space velocity of 20,000 $hr^{-1}$. It was maintained for 20 to 60 minutes. until a steady state was reached. When the steady state was reached, the concentrations of CO and $SO_2$ were analyzed by a non-dispersive infrared gas analyzer (NDIR method).

The results obtained are shown in Table 16.

Table 16

| Catalyst | CO conversion (%) | | | $SO_2$ conversion (%) |
| --- | --- | --- | --- | --- |
| | 200° C. | 250° C. | 300° C. | 300° C. |
| Example 72 | 91 | 100 | 100 | 2 |
| Example 73 | 93 | 100 | 100 | 5 |
| Example 74 | 95 | 100 | 100 | 3 |
| Comparative Example 8 | 94 | 100 | 100 | 32 |
| Comparative Example 9 | 95 | 100 | 100 | 33 |
| Comparative Example 10 | 98 | 100 | 100 | 37 |

What we claim is:

1. A catalyst for purifying exhaust and waste gases comprising
    A. a support substrate comprising 2 to 100% by weight of an oxide complex of titanium and phosphorus containing titanium and phosphorus in such a proportion that the molar ratio of $TiO_2$ to $P_2O_5$ is from 5.0 to 0.5 and 98 to 0% by weight of aluminum oxide, and
    B. supported on said substrate as a catalytic substance, 2 to 300 parts by weight, calculated as metal oxide per 100 parts by weight of the support substrate (A), of at least one heavy metal selected from the group consisting of Ni, Cu, Cr, Fe, Co, Mn, Bi, V, W, Mo, Sn, Zn, Zr, Pb, Sb, Ti, Ta, Cd and Nb, or 0.01 to 1.0 parts by weight, calculated as metal per 100 parts by weight of the support substrate (A), of at least one noble metal selected from the group consisting of Pt, Pd, Rh, Ir, Os and Ru.

2. The catalyst of claim 1 wherein said oxide of titanium and phosphorus contains titanium and phosphorus in such a proportion that the molar ratio of $TiO_2$ to $P_2O_5$ is from 2.6 to 1.0.

3. The catalyst of claim 1 wherein said support substrate (A) has a pore volume of 0.4 to 8 cc/g.

4. The catalyst of claim 1 wherein said support substrate (A) is an oxide complex of titanium and phosphorus having a pore volume of 2.5 to 5 cc/g.

5. The catalyst of claim 1 wherein said support substrate (A) consists of 2 to 50% by weight of the oxide complex of titanium and phosphorus and 98 to 50% by weight of the aluminum oxide.

6. The catalyst of claim 1 wherein said catalytic substance (B) is an oxide of copper, chromium, iron, vanadium or tungsten.

7. The catalyst of claim 1 wherein said catalytic substance (B) is palladium or both palladium and platinum.

* * * * *